US007235808B2

(12) United States Patent
Sawazumi

(10) Patent No.: US 7,235,808 B2
(45) Date of Patent: Jun. 26, 2007

(54) RADIOGRAPHIC IMAGE READING METHOD AND RADIOGRAPHIC IMAGE READING APPARATUS

(75) Inventor: Tsuneo Sawazumi, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 252 days.

(21) Appl. No.: 11/024,395

(22) Filed: Dec. 28, 2004

(65) Prior Publication Data

US 2005/0145808 A1 Jul. 7, 2005

(30) Foreign Application Priority Data

Jan. 6, 2004 (JP) ............................. 2004-001044
Oct. 8, 2004 (JP) ............................. 2004-296022

(51) Int. Cl.
*G01T 1/105* (2006.01)

(52) U.S. Cl. ........................................ 250/584

(58) Field of Classification Search ................. 250/584
See application file for complete search history.

(56) References Cited

U.S. PATENT DOCUMENTS

2002/0043627 A1* 4/2002 Bergh ...................... 250/462.1
2003/0155529 A1* 8/2003 Morikawa et al. ....... 250/484.4

* cited by examiner

*Primary Examiner*—David Porta
*Assistant Examiner*—Christopher Webb
(74) *Attorney, Agent, or Firm*—Lucas & Mercanti, LLP

(57) ABSTRACT

A radiographic image reading method includes: scanning a photostimulable phosphor plate with excitation light by a scanning section such that a relative relationship between an average area S2 of column crystals of a photostimulable phosphor and an average area S1 of a beam of the excitation light emitted from a light source is $S1 \geqq 10 \times S2$, the photostimulable phosphor plate comprising: a support; and a photostimulable phosphor layer comprising the column crystals of the photostimulable phosphor formed on a surface of the support, wherein radiation energy is stored in the photostimulable phosphor layer; and detecting photostimulated light by a detector, which is emitted from the photostimulable phosphor layer by the scanning with the excitation light.

12 Claims, 6 Drawing Sheets

RADIOGRAPHIC IMAGE READING METHOD AND RADIOGRAPHIC IMAGE READING APPARATUS

BACKGROUND OF THE INVENTION

1. Field of the Invention

The present invention relates to a radiographic image reading method and a radiographic image reading apparatus used in an input system of a medical radiographic image.

2. Description of Related Art

In the medical field, a radiographic image such as X-ray is often used for diagnosing diseases. Hitherto a method of using so-called radiography that a phosphor layer (phosphor screen) is irradiated with radiation passing through a specimen to generate visible light with which a film using silver halide is irradiated in the same way as taking a normal photograph and development is performed after forming a latent image, has been generally used as a method for forming a radiographic image.

In recent years, a method that radiation passing through a specimen is absorbed by a photostimulable phosphor of a photostimulable phosphor plate, subsequently radiation energy stored in the photostimulable phosphor by absorption is emitted as photostimulated light by exciting the photostimulable phosphor by, for example, light or thermal energy and the photostimulated light is detected for imaging, has been proposed as a method for forming a radiographic image without using a film coated with silver halide. Here, the photostimulable phosphor plate is a form of a radiographic image conversion panel.

A radiographic image conversion panel represented by such a photostimulable phosphor plate is desired to have high sensitivity for radiation as much as possible and give an image with good image qualities (sharpness, graininess and the like). Hitherto study for supersensitization and improvement of image qualities of a radiographic image conversion panel has been progressed.

For example, JP Tokukaihei-5-150100A discloses a radiographic image conversion panel comprising a photostimulable phosphor layer formed on a support wherein a light transmittance (Tth) in the thickness direction and a light transmittance (Tfl) in the plane direction have a relationship of $0<Tfl/Tth\leqq 0.7$.

Owing to such a structure of a radiographic image conversion panel, photostimulable excitation light incoming to the radiographic image conversion panel at a certain angle penetrates deeply in the thickness direction and spread of the light in the plane direction is suppressed and thus the sharpness is improved.

JP Tokukaihei-6-230198A discloses a radiographic image conversion panel wherein a photostimulable phosphor layer comprising a column crystal and a surface of the photostimulable phosphor layer comprising tops of the column crystal is planarized.

Owing to such a structure of a radiographic image conversion panel, there is less unevenness in the surface of the photostimulable phosphor layer. Therefore scattering of photostimulable excitation light is suppressed and thus the sharpness of an image is improved.

JP Tokukai-2002-131493A discloses a radiographic image conversion panel comprising a phosphor sheet comprising a reflection layer, an excitation light absorbing layer A that absorbs excitation light and a photostimulable phosphor layer are laminated on a support in this order and a protect film protecting the sheet and comprising an excitation light absorbing layer B. This panel is configured so that each excitation light absorbing layer has less absorbance at a peak wavelength in photostimulated luminescence than in incident light (excitation light).

Owing to such a structure of a radiographic image conversion panel, deterioration of sharpness resulting from excitation laser light can be prevented by making absorbance of photostimulated luminescence at the luminescence peak wavelength less than absorbance of excitation light at the peak wavelength. Thereby, the sensitivity for radiation is improved and an image with excellent sharpness can be obtained.

However, the method for manufacturing a radiographic image conversion panel described in JP Tokukaihei-5-150100A requires the step in which a material that has a different optical refractive index or transmittance from the photostimulable phosphor is formed in the thickness direction like a wall in order to make the ratio of the light transmittance (Tth) in the thickness direction and the light transmittance (Tfl) in the plane direction $0<Tfl/Tth\leqq 0.7$.

For the purpose of planarization of the surface of a photostimulable phosphor layer, the method for manufacturing a radiographic image conversion panel described in JP Tokukaihei-6-230198A requires the step for a forming continuous membrane in which, in formation of a column crystal by a vapor phase deposition method, the column crystal is grown to a predetermined height and subsequently a vapor phase deposition condition is changed to a condition in which a continuous membrane is formed, and further the vapor phase deposition of the column crystal is continued.

For the purpose of providing difference between absorbance of excitation light in the photostimulable phosphor layer and absorbance of excitation light in the protect film, the method for manufacturing a radiographic image conversion panel described in JP Tokukai-2002-131493A requires the step in which an excitation light absorbing layer is provided for the protect film and meanwhile an excitation light absorbing layer that has no direct relation with photostimulated luminance is formed between the support and the photostimulable phosphor layer also.

As above, for the purpose of improving sensitivity for radiation and obtaining an image with excellent sharpness, any one of the above-described method for manufacturing a radiographic image conversion panel requires the step of processing the photostimulable phosphor layer or providing the photostimulable phosphor layer with the wall, the membrane, or the layer that has no direct relation with photostimulated luminance. Accordingly, there is a problem that a material and manufacturing technique for forming such a membrane or layer are required and a manufacturing step become complex.

SUMMARY OF THE INVENTION

The present invention has been accomplished in order to solve the above problem. An object of the present invention is to provide a radiographic image reading apparatus and method whereby an image having high sensitivity to radiation and high image quality can be obtained without processing a photostimulable phosphor layer or providing the photostimulable phosphor layer with a component not related directly to photostimulated luminance.

In order to achieve the above purpose, in accordance with the first aspect of the invention, a radiographic image reading method comprises: scanning a photostimulable phosphor plate with excitation light by a scanning section such that a relative relationship between an average area S2 of column crystals of a photostimulable phosphor and an average area S1 of a beam of the excitation light emitted from a light source is $S1 \geqq 10 \times S2$, the photostimulable phosphor plate comprising: a support; and a photostimulable phosphor layer comprising the column crystals of the photostimulable phosphor formed on a surface of the support, wherein radiation energy is stored in the photostimulable phosphor layer; and detecting photostimulated light by a detector, which is emitted from the photostimulable phosphor layer by the scanning with the excitation light.

As above, the relative relationship between the average area S2 of column crystals and the average area S1 of a beam of the excitation light is made $S1 \geqq 10 \times S2$ and the area of excitation light is made equal to or larger than a predetermined ratio relative to the area of the column crystals, which reduces occurrence of random image noise like spots caused by random light interference due to coherency of the excitation light.

Accordingly, it is possible to suppress occurrence of random image noise like spots caused by random light interference due to coherency of the excitation light and read an image having better image quality with more excellent sharpness than ever before.

Preferably, the average area S2 of the column crystals is $1 \times 10^{-6}$ to $1 \times 10^{-3}$ $mm^2$ and the average area S1 of the beam of the excitation light is $3 \times 10^{-4}$ to $3 \times 10^{-2}$ $mm^2$.

As above, these values of the average area S2 of the column crystals and the average area S1 of the beam of excitation light makes it possible that the excitation light excites the column crystals uniformly. Therefore the fluctuation of the intensity of light received as photostimulated light can be suppressed particularly effectively.

Accordingly, the fluctuation of the intensity of light received as photostimulated light can be suppressed particularly effectively.

Preferably, the relative relationship between the average area S2 of the column crystals and the average area S1 of the beam of the excitation light is made $10 \times S2 \leqq S1 \leqq 10000 \times S2$.

As above, an upper limit for the size of the average area S1 of the beam of excitation light is provided, and accordingly an absolute resolution in image reading is not degraded.

Accordingly, without degrading absolute resolution in image reading, it is possible to suppress occurrence of random image noise like spots caused by random light interference due to coherency of the excitation light and read an image having better image quality with more excellent sharpness than ever before.

In accordance with the second aspect of the invention, a radiographic image reading method comprises: scanning a photostimulable phosphor plate with excitation light by a scanning section such that a relative relationship between an average area S2 of column crystals of a photostimulable phosphor and an average area S3 of a beam of the excitation light emitted from a light source and transmitted through a protective layer is $S3 \geqq 10 \times S2$, the photostimulable phosphor plate comprising: a support; a photostimulable phosphor layer comprising the column crystals of the photostimulable phosphor formed on a surface of the support; and the protective layer provided so as to cover a surface of the photostimulable phosphor layer, wherein radiation energy is stored in the photostimulable phosphor layer; and detecting photostimulated light by a detector, which is emitted from the photostimulable phosphor layer by the scanning with the excitation light.

As above, even when the protective layer is provided so as to cover the surface of the photostimulable phosphor layer, the relative relationship between the average area S3 of a beam of the excitation light transmitted through the protective layer and the average area S2 of column crystals is made $S3 \geqq 10 \times S2$ and the area of excitation light with which the photostimulable phosphor plate is scanned is made equal to or larger than a predetermined ratio relative to the area of the column crystals, which reduces occurrence of random image noise like spots caused by random light interference due to coherency of the excitation light. Additionally, by providing the protective layer so as to cover the surface of the photostimulable phosphor layer, it is made possible to prevent deterioration and damage of the photostimulable phosphor generally having high hygroscopicity owing to moisture absorption.

Accordingly, even when the protective layer is provided so as to cover the surface of the photostimulable phosphor layer, the relative relationship between the average area S3 of a beam of the excitation light transmitted through the protective layer and the average area S2 of column crystals is made $S3 \geqq 10 \times S2$ and the area of excitation light with which the photostimulable phosphor plate is scanned is made equal to or larger than a predetermined ratio relative to the area of the column crystals, which reduces occurrence of random image noise like spots caused by random light interference due to coherency of the excitation light. Additionally, by providing the protective layer so as to cover the surface of the photostimulable phosphor layer, it is made possible to prevent deterioration and damage of the photostimulable phosphor generally having high hygroscopicity owing to moisture absorption.

Preferably, the average area S2 of the column crystals is $1 \times 10^{-6}$ to $1 \times 10^{-3}$ $mm^2$ and the average area S3 of the beam of the excitation light transmitted through the protective layer is $3 \times 10^{-4}$ to $3 \times 10^{-2}$ $mm^2$.

As above, these values of the average area S2 of the column crystals and the average area S3 of the beam of excitation light makes it possible that the excitation light excites the column crystals uniformly. Therefore the fluctuation of the intensity of light received as photostimulated light can be suppressed particularly effectively.

Accordingly, the fluctuation of the intensity of light received as photostimulated light can be suppressed particularly effectively.

Preferably, the relative relationship between the average area S2 of the column crystals and the average area S3 of the beam of the excitation light transmitted through the protective layer is made $10 \times S2 \leqq S3 \leqq 10000 \times S2$.

As above, an upper limit for the size of the average area S3 of the beam of excitation light with which the photostimulable phosphor plate is scanned is provided, and accordingly an absolute resolution in image reading is not degraded.

Accordingly, even when a radiographic image read from the photostimulable phosphor plate provided with the protective layer, it is possible to suppress occurrence of random image noise like spots caused by random light interference due to coherency of the excitation light and read an image having better image quality with more excellent sharpness than ever before without degrading absolute resolution in image reading.

Preferably one or both surface(s) of the protective layer are embossed with many micro protrusions.

As above, one or both surface(s) of the protective layer are embossed with many micro protrusions, and accordingly the beam radius of the excitation light transmitted through the protective layer is expanded and the average area S3 of the beam of the excitation light with which the photostimulable phosphor plate is scanned becomes equal to or large than a predetermined ratio of the average area S2 of the column crystals.

Accordingly, it is possible to reduce occurrence of random image noise like spots caused by random light interference due to coherency of the excitation light.

Preferably, the protective layer contains particles having light scattering properties.

As above, the protective layer contains particles having light scattering properties, and accordingly the beam radius of the excitation light transmitted through the protective layer is expanded and the average area S3 of the beam of the excitation light with which the photostimulable phosphor plate is scanned becomes equal to or large than a predetermined ratio of the average area S2 of the column crystals.

Accordingly, it is possible to reduce occurrence of random image noise like spots caused by random light interference due to coherency of the excitation light.

Preferably, the protective layer comprises a multilayer film using one or more film layers treated by coloring with a colorant selectively absorbing light having a particular wavelength.

As above, separation of the excitation laser light and the photostimulated light can be made easy by giving the protective layer characteristics that unnecessary light not related to excitation of radiation energy is absorbed and the excitation laser light and the photostimulated light is transmitted by the film layer that is treated by coloring with a colorant selectively absorbing light of particular wavelength. It is possible to reduce image noise and damage of the photostimulable phosphor plate owing to unnecessary light not related to excitation. By giving the protective layer characteristics of transmitting light in a predetermined visible range as well as the excitation laser light and the photostimulated light, it is made possible to facilitate detection and discrimination of defects by visual recognition of damage and adhesion of foreign material to the inside of the photostimulable phosphor and the protective layer or dirt adhesion between the photostimulable phosphor layer and the protective layer in production process of a photostimulable phosphor plate and repeated use.

Accordingly, the sharpness of a radiographic image can be improved by making transmission characteristics of the laser light and the photostimulated light relatively stronger than unnecessary light not related to excitation. By facilitating detection and discrimination of defects by visual recognition of damage and adhesion of foreign material to the inside of the photostimulable phosphor and the protective layer or dirt adhesion between the photostimulable phosphor layer and the protective layer, reduction of the effect of these on image quality is made easy.

In accordance with the third aspect of the invention, a radiographic image reading apparatus comprises: a light source for emitting a beam of excitation light to a photostimulable phosphor plate comprising: a support; and a photostimulable phosphor layer comprising column crystals of a photostimulable phosphor formed on a surface of the support, wherein radiation energy is stored in the photostimulable phosphor layer; a scanning section for scanning the photostimulable phosphor plate with the excitation light such that a relative relationship between an average area S2 of the column crystals and an average area S1 of the beam of the excitation light is $S1 \geqq 10 \times S2$; and a detector for detecting photostimulated light emitted from the photostimulable phosphor layer by the scanning with the excitation light.

As above, the relative relationship between the average area S2 of column crystals and the average area S1 of a beam of the excitation light is made $S1 \geqq 10 \times S2$ and the area of excitation light is made equal to or larger than a predetermined ratio relative to the area of the column crystals, which reduces occurrence of random image noise like spots caused by random light interference due to coherency of the excitation light.

Accordingly, it is possible to read an image having better image quality with more excellent sharpness than ever before.

Preferably, the average area S2 of the column crystals is $1 \times 10^{-6}$ to $1 \times 10^{-3}$ $mm^2$ and the average area S1 of the beam of the excitation light is $3 \times 10^{-4}$ to $3 \times 10^{-2}$ $mm^2$.

As above, these values of the average area S2 of the column crystals and the average area S1 of the beam of excitation light makes it possible that the excitation light excites the column crystals uniformly. Therefore the fluctuation of the intensity of light received as photostimulated light can be suppressed particularly effectively.

Accordingly, the fluctuation of the intensity of light received as photostimulated light can be suppressed particularly effectively.

Preferably, the relative relationship between the average area S2 of the column crystals and the average area S1 of the beam of the excitation light is made $10 \times S2 \leqq S1 \leqq 10000 \times S2$.

As above, an upper limit for the size of the average area S1 of the beam of excitation light is provided, and accordingly an absolute resolution in image reading is not degraded.

Accordingly, without degrading absolute resolution in image reading, it is possible to suppress occurrence of random image noise like spots caused by random light interference due to coherency of the excitation light and read an image having better image quality with more excellent sharpness than ever before.

In accordance with the fourth aspect of the invention, a radiographic image reading apparatus comprises: a light source for emitting a beam of excitation light to a photostimulable phosphor plate comprising: a support; a photostimulable phosphor layer comprising column crystals of a photostimulable phosphor formed on a surface of the support; and the protective layer provided so as to cover a surface of the photostimulable phosphor layer, wherein radiation energy is stored in the photostimulable phosphor layer; a scanning section for scanning the photostimulable phosphor plate with the excitation light such that a relative relationship between an average area S2 of the column crystals and an average area S3 of the beam of the excitation light transmitted through the protective layer is $S3 \geqq 10 \times S2$; and a detector for detecting photostimulated light emitted from the photostimulable phosphor layer by the scanning with the excitation light.

As above, even when the protective layer is provided so as to cover the surface of the photostimulable phosphor plate, the relative relationship between the average area S3 of a beam of the excitation light transmitted through the protective layer and the average area S2 of column crystals is made $S3 \geqq 10 \times S2$ and the area of excitation light with which the photostimulable phosphor plate is scanned is made equal to or larger than a predetermined ratio relative to the area of the column crystals, which reduces occurrence of random image noise like spots caused by random light interference due to coherency of the excitation light. Additionally, by providing the protective layer so as to cover the surface of the photostimulable phosphor layer, it is made possible to prevent deterioration and damage of the photostimulable phosphor generally having high hygroscopicity owing to moisture absorption.

Accordingly, even when radiographic image is read from the photostimulable phosphor plate provided with a protective layer, it is possible to suppress occurrence of random image noise like spots caused by random light interference due to coherency of the excitation light and read an image having better image quality with more excellent sharpness than ever before.

Preferably, the average area S2 of the column crystals is $1\times10^{-6}$ to $1\times10^{-3}$ $mm^2$ and the average area S3 of the beam of the excitation light transmitted through the protective layer is $3\times10^{-4}$ to $3\times10^{-2}$ $mm^2$.

As above, these values of the average area S2 of the column crystals and the average area S3 of the beam of excitation light makes it possible that the excitation light excites the column crystals uniformly. Therefore the fluctuation of the intensity of light received as photostimulated light can be suppressed particularly effectively.

Accordingly, the fluctuation of the intensity of light received as photostimulated light can be suppressed particularly effectively.

Preferably, the relative relationship between the average area S2 of the column crystals and the average area S3 of the beam of the excitation light transmitted through the protective layer is made $10\times S2 \leqq S3 \leqq 10000\times S2$.

As above, an upper limit for the size of the average area S3 of the beam of excitation light with which the photostimulable phosphor plate is scanned is provided, and accordingly an absolute resolution in image reading is not degraded.

Accordingly, even when a radiographic image read from the photostimulable phosphor plate provided with the protective layer, it is possible to suppress occurrence of random image noise like spots caused by random light interference due to coherency of the excitation light and read an image having better image quality with more excellent sharpness than ever before without degrading absolute resolution in image reading.

Preferably one or both surface(s) of the protective layer are embossed with many micro protrusions.

As above, one or both surface(s) of the protective layer are embossed with many micro protrusions, and accordingly the beam radius of the excitation light transmitted through the protective layer is expanded and the average area S3 of the beam of the excitation light with which the photostimulable phosphor plate is scanned becomes equal to or large than a predetermined ratio of the average area S2 of the column crystals.

Accordingly, it is possible to reduce occurrence of random image noise like spots caused by random light interference due to coherency of the excitation light.

Preferably, the protective layer contains particles having light scattering properties.

As above, the protective layer contains particles having light scattering properties, and accordingly the beam radius of the excitation light transmitted through the protective layer is expanded and the average area S3 of the beam of the excitation light with which the photostimulable phosphor plate is scanned becomes equal to or large than a predetermined ratio of the average area S2 of the column crystals.

Accordingly, it is possible to reduce occurrence of random image noise like spots caused by random light interference due to coherency of the excitation light.

Preferably, the protective layer comprises a multilayer film using one or more film layers treated by coloring with a colorant selectively absorbing light having a particular wavelength.

As above, separation of the excitation laser light and the photostimulated light can be made easy by giving the protective layer characteristics that unnecessary light not related to excitation of radiation energy is absorbed and the excitation laser light and the photostimulated light is transmitted by the film layer that is treated by coloring with a colorant selectively absorbing light of particular wavelength. It is possible to reduce image noise and damage of the photostimulable phosphor plate owing to unnecessary light not related to excitation. By giving the protective layer characteristics of transmitting light in a predetermined visible range as well as the excitation laser light and the photostimulated light, it is made possible to facilitate detection and discrimination of defects by visual recognition of damage and adhesion of foreign material to the inside of the photostimulable phosphor and the protective layer or dirt adhesion between the photostimulable phosphor layer and the protective layer in production process of a photostimulable phosphor plate and repeated use.

Accordingly, the sharpness of a radiographic image can be improved by facilitating separation of spectra of the excitation light and the photostimulated light and making transmission characteristics of the laser light and the photostimulated light relatively stronger than unnecessary light not related to excitation. By facilitating detection and discrimination of defects by visual recognition of damage and adhesion of foreign material to the inside of the photostimulable phosphor and the protective layer or dirt adhesion between the photostimulable phosphor layer and the protective layer, reduction of the effect of these on image quality is made easy.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENTS OF THE INVENTION

Hereinbelow, an embodiment of the present invention will be described with reference to FIGS. 1 to 9.

Figure 1:
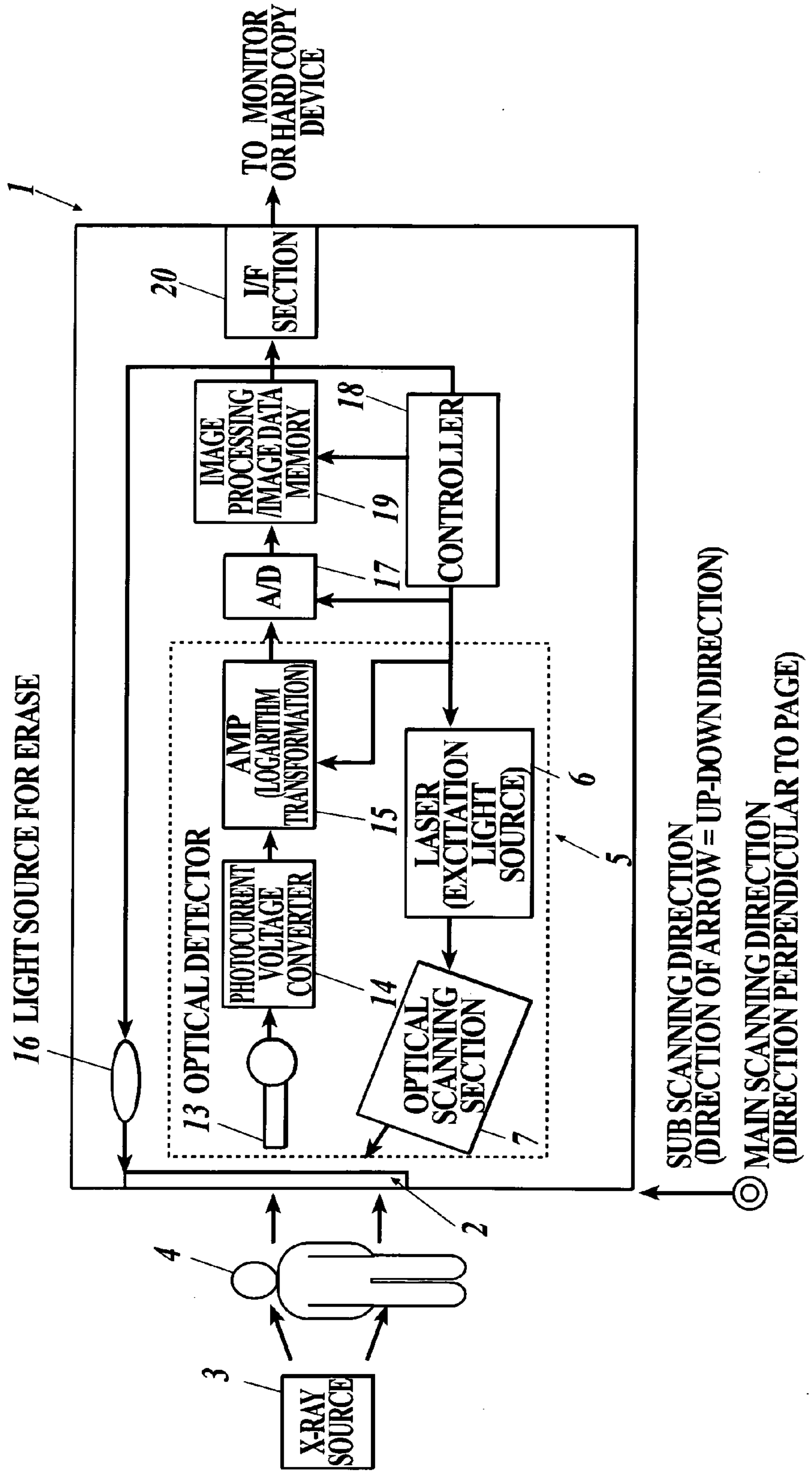
FIG. 1 is a block diagram showing a configuration of a radiographic image reading apparatus according to the present embodiment.

FIG. 1 is a block diagram showing a configuration of a radiographic image reading apparatus 1 according to the present embodiment. In the radiographic image reading apparatus 1, radiation that is emitted from a radiation source 3 and passes through a specimen 4 is irradiated to a photostimulable phosphor plate 2, and accordingly a transmitted radiation image of the specimen 4 as radiographic information is stored/recorded in the photostimulable phosphor plate 2.

The radiographic image reading apparatus 1 comprises a read head 5 for reading a latent image on the basis of the radiographic information recorded in the photostimulable phosphor plate 2. The read head 5 comprises a laser light source 6 for generating photostimulable excitation light (hereinafter referred to as "excitation laser light 23") irradiated to the photostimulable phosphor plate 2 and an optical scanning section 7 for scanning the photostimulable phosphor plate 2 with the excitation laser light 23 emitted from the laser light source 6 in the main scanning direction perpendicular to the page.

Figure 2:
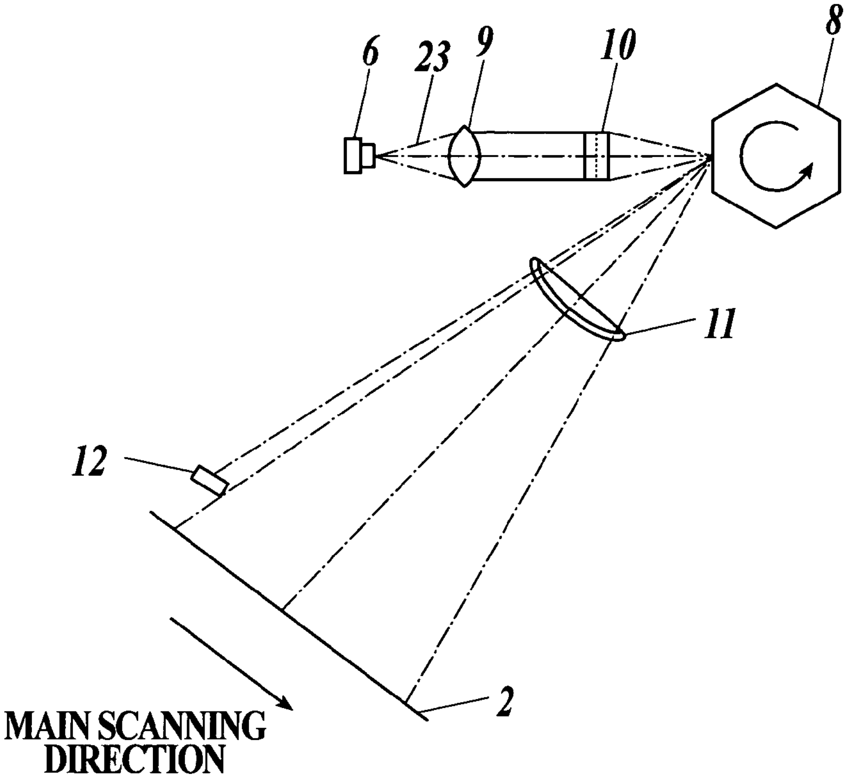
FIG. 2 is a schematic block diagram showing an optical scanning section according to the present embodiment.

FIG. 2 shows a situation that the surface of the photostimulable phosphor plate 2 is scanned with the excitation laser light 23 emitted from the laser light source 6 by the optical scanning section 7. As shown in FIG. 2, the optical scanning section 7 is provided with a polygon mirror 8 that comprises a sequence of planar reflection surfaces at the periphery of the polygon mirror 8 and scans the surface of the photostimulable phosphor plate 2 in the main scanning direction by rotating and reflecting the excitation laser light 23 emitted from the laser light source 6. A collimating lens 9 for changing the excitation laser light 23 emitted from the laser light source 6 to parallel rays to emit the rays is provided between the laser light source 6 and the polygon mirror 8. There is provided a cylindrical lens 10 for focusing the parallel rays of the excitation laser light 23 to be linear only in the direction perpendicular to the rotation axis of the polygon mirror 8 to be made incident on the surface of the polygon mirror 8 between the collimating lens 9 and the polygon mirror 8.

Furthermore, there is provided an fθ lens 11 for converting motion with uniform angular velocity of the excitation laser light 23 scanned by the polygon mirror 8 into motion with uniform velocity and uniforming the beam radius of the excitation laser light 23 on the surface of the photostimulable phosphor plate 2 between the polygon mirror 8 and the photostimulable phosphor plate 2. Thereby, it is possible to scan the surface of the photostimulable phosphor plate 2 with the excitation laser light 23 having a uniform beam velocity and a uniform beam radius.

A main scanning synchronization sensor 12 for detecting an initial timing of main scanning is provided in a non-image area of scanning line. The main scanning synchronization sensor 12 is a base point for calculating a reading station in the main scanning direction.

Here, the average area S1 of a beam of the excitation laser light 23 irradiated to the photostimulable phosphor plate 2 will be described.

The beam area of laser light is defined as a range surrounded by a beam radius which is a part defined by a threshold of $1/e^2$ for the peak of intensity in measurement of the intensity distribution of the section perpendicular to the laser traveling direction. In a system in which the optical axis is not perpendicularly incident on the surface of the photostimulable phosphor, the beam area is defined additionally by taking account of an effect that a beam is made obliquely incident to expand the area on the surface of the photostimulable phosphor substantially, i.e. a beam radius projected onto the surface of the photostimulable phosphor. In the present specification, the average area of a beam of the excitation laser light 23 is defined as an equalized beam area of the excitation laser light 23 irradiated to the photostimulable phosphor plate 2.

In the optical scanning section 7, the size of the beam radius of the excitation laser light 23 with which the surface of the photostimulable phosphor plate 2 is scanned can be adjusted by adjusting the beam radius of the excitation laser light 23 incident to the fθ lens 11 or the focal length of the fθ lens 11. When the focal length of the fθ lens 11 is made short, the spot size on an image-formation plane becomes relatively small. When a beam incident to the fθ lens 11 is made larger by adjustment of the focal length of the collimating lens 9, the spot size of the image-formation plane becomes relatively small. Thereby, it is possible to control the average area S1 of the beam of the excitation laser light 23.

It is made possible to adjust the beam radius of the excitation laser light 23 incident to the fθ lens 11 by adjusting the focal length of the collimating lens 9, by designing the numerical aperture of the collimating lens 9 accordingly, by providing a mechanism, such as a beam expander, for adjustment of a beam radius at the optical pass between the collimating lens 9 and the cylindrical lens 10, or the like.

The read head 5 is made so as to be moved in the sub scanning direction by a not shown moving section of the read head 5. Thus, by scan of the optical scanning section 7 with the excitation laser light 23 in the main scanning direction and by movement of the read head 5 in the sub scanning direction, it is made possible to irradiating the whole two-dimensional area of the photostimulable phosphor plate 2 with the excitation laser light 23.

Furthermore, as shown in FIG. 1, the read head 5 is provided with an optical detector 13 for detecting photostimulated luminescence (photostimulated light 24) generated from the photostimulable phosphor plate 2 by the excitation laser light 23. The photostimulated light 24 detected by the optical detector 13 is converted into photocurrent by photoelectric conversion to be transmitted to a photocurrent-voltage converter 14. In the photocurrent-voltage converter 14, the photocurrent is converted into photovoltage to be transmitted to an amplifier 15. In the amplifier 15, the photovoltage is amplified and logarithmically converted to be transmitted an A/D converter 17.

In the A/D converter 17, for data processing based on the photovoltage, data relating to the photovoltage are converted into digital data to be transmitted as radiographic information to the image processing/image data memory 19.

In the image processing/image data memory 19, the transmitted data are accumulated for respective scanning lines. When thus the image processing/image data memory 19 repeatedly takes in data in the sub scanning direction and finishes reading the whole surface of the photostimulable phosphor plate 2, the radiographic information is taken in as the same two-dimensional image as the latent image on the photostimulable phosphor plate 2. Then, according to data request, the radiographic information is transmitted from an interface (I/F) section 20 to a not shown display device, such as a monitor, or a hard-copy device, such as a printer, to be displayed or printed.

In order to release residual energy not released perfectly by the excitation laser light 23, a light source 16 for erase irradiates the photostimulable phosphor plate 2 with light having a sufficient wavelength and intensity to release photostimulated light 24 having the residual energy. The light source 16 for erase includes a halogen lamp.

A controller 18 controls operation timing of the laser light source 6, the photocurrent-voltage converter 14, the A/D converter 17, the image processing/image data memory 19 and the light source 16 for erase. According to a predetermined program, the controller 18 controls output and lighting timing of the laser light source 6, sensitivities and operation ranges of the photocurrent-voltage converter 14 and the A/D converter 17, and intensity, irradiation time and operation timing of the light source 16 for erase.

Figure 3:
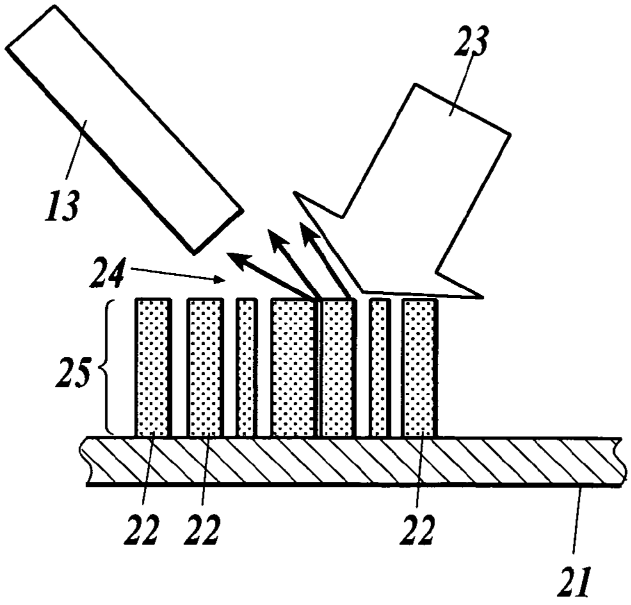
FIG. 3 is a sectional view of a photostimulable phosphor plate showing a situation that a photostimulable phosphor layer according to the present invention is irradiated with excitation laser light.

As shown in FIG. 3, the photostimulable phosphor plate 2 is formed of a support 21 and a photostimulable phosphor layer 25 comprising column crystals of the photostimulable phosphor 22 formed on the support 21. For the purpose of illustration, a protective layer 26 (see FIG. 7) that is provided in such a way that the surface of the photostimulable phosphor layer 25 is covered is omitted in FIG. 3.

The photostimulable phosphor plate 2 like this is obtained by forming the photostimulable phosphor layer 25 on the surface of the support 21 by a vapor phase deposition method.

As the support 21 used in the present embodiment, various polymeric material, glass, ceramics, metal, carbon fiber, composite material including carbon fiber and the like may be used and, for example, a plate glass such as quartz, borosilicate glass, chemically strengthened glass and crystallized glass; ceramics, such as alumina and silicon nitride; a plastic film, such as cellulose acetate film, polyester film, polyethylene terephthalate film, polyamide film, polyimide film, triacetate film and polycarbonate film; a metal sheet, such as aluminum, iron, cupper and chromium; a metal sheet having a cover such as hydrophilic particles, and the like are preferable.

The surface of the support 21 may be a smooth surface, or for the purpose of improvement of adhesion to the photostimulable phosphor layer 25, may be a mat surface. For the purpose of improvement of adhesion between the support 21 and the photostimulable phosphor layer 25, an adhesive layer may be provided for the surface of the support 21 in advance according to need.

As photostimulable phosphor used in the present embodiment, for example, photostimulable phosphor comprising alkali halide as the following general formula (1):

$$M^1X \cdot aM^2X' \cdot bM^3X'':eA \qquad \text{General formula (1)}$$

In the general formula (1), M1 represents at least one kind of alkali metal atom selected from atoms of Li, Na, K, Rb and Cs, preferably an alkali metal atom selected from atoms of Rb and Cs among others, and more preferably an atom of Cs. M2 represents at least one kind of alkali metal atom selected from atoms of Li, Na, K, Rb and Cs except M1. M3 represents at least one kind of trivalent metal atom selected from atoms of Y, La, Ce, Pr, Nd, Pm, Sm, Eu, Gd, Tb, Dy, Ho, Er, Tm, Yb and Lu, while it is preferable to use a trivalent metal atom selected from atoms of Y, Ce, Sm, Eu, Al, La, Gd and Lu.

X, X' and X" represent at least one kind of halogen atom selected from atoms of F, Cl, Br and I. However, from the viewpoint of improvement of photostimulated luminescence luminance of a photostimulable phosphor, preferably at least one kind of halogen atom selected from atoms of F, Cl and Br, and more preferably at least one kind of halogen atom selected from atoms of Br and I.

"A" in the formula (1) represents at least one kind of rare earth element selected from atoms of Eu, Tb, In, Cs, Ce, Tm, Dy, Pr, Ho, Nd, Yb, Er, Gd, Lu, Sm and Y, and "a", "b" and "e" respectively represent values within the ranges of $0 \leqq a < 0.5$, $0 \leqq b < 0.5$ and $0 < e \leqq 0.2$.

The photostimulable phosphor layer 25 is formed by supplying vapor of the above-described photostimulable phosphor or raw material of the photostimulable phosphor or the raw material onto the surface of the support 21 at a specific angle and performing vapor growth of a crystal by a vapor phase deposition method. The photostimulable phosphor layer 25 obtained in this way has an elongated column crystal structure in which crystals are independent of each other. Preferably, each is a column crystal with an even area and form.

A column crystal grows at a growth angle that is approximately half of an incident angle of a vapor flow of the photostimulable phosphor in deposition. Such a method for supplying a vapor flow of photostimulable phosphor or raw material of photostimulable phosphor to the surface of the support 21 at a certain incident angle includes a method of placing the support 21 so as to slope mutually to a crucible containing an evaporation source, and a method of placing the support 21 and a crucible parallel to each other to supply and deposit vapor from the evaporation plane of the crucible containing an evaporation source at a certain angle to the surface of the support 21 by using a slit or the like. It is preferable to set the distance of the shortest space between the support 21 and the crucible according to an average range of the photostimulable phosphor.

Here, the average area S2 of the column crystals will be described.

Figure 4:
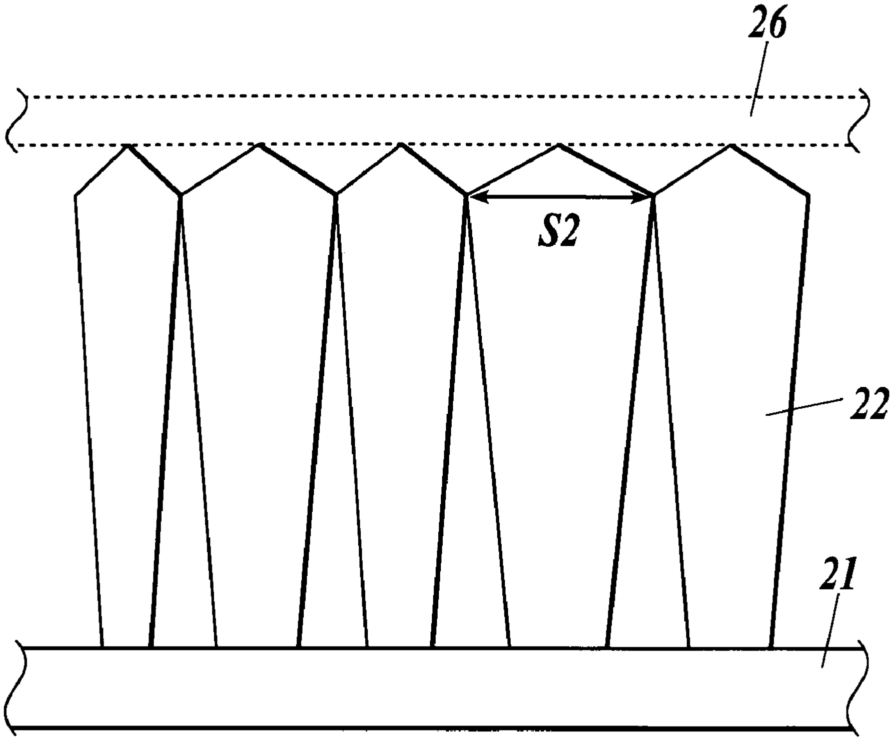
FIG. 4 is a sectional view of the photostimulable phosphor plate illustrating an average area S2 of column crystals according to the present embodiment.

As shown in FIG. 4, a sectional form of column crystals formed on the surface of the support 21 is a polygon or a circle as a whole (approximately a pentagon in the present embodiment). A form of an apical portion of the column crystal is approximately conical. In the specification, an area of the column crystal is defined as the area of a base of the approximate cone of an apical portion of the column crystal, i.e. the section that is the largest when the column crystal is seen from the direction of the top.

Figure 5:
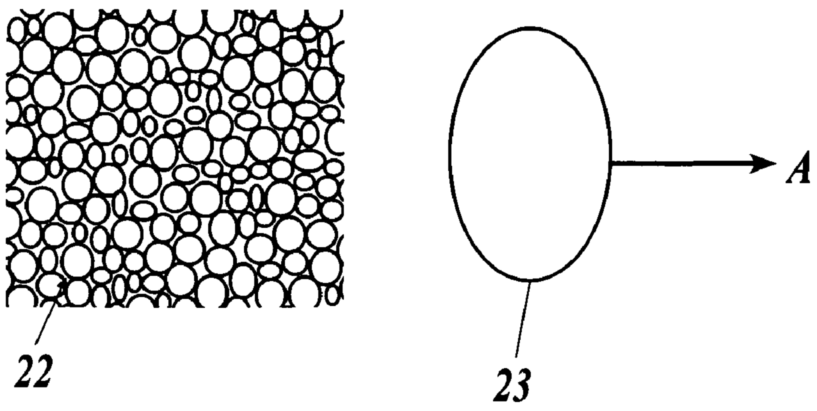
FIG. 5 is a figure illustrating a beam area of the excitation laser light and an average area of the surface of the column crystals according to the present embodiment.

Here, the form of the section that is the largest when the column crystal is seen from the direction of the top is a circle or ellipse as shown in FIG. 5 and also shapeless amorphous forms are present. Also variation occurs in sizes of the sections of the column crystals. Whereat, in the specification, an average area S2 of the column crystals is defined as an equalized area of the sections of the column crystals with various forms and sizes which is formed on the surface of the support 21.

The average area S2 of the column crystals can be obtained by detecting contours of the sections of the column crystals by an image obtained by an optical microscope or an SEM (scanning electron microscope), calculating an area enclosed the contour and equalizing the areas of the section of the column crystals in view of the microscope. Because some variation occurs in areas of the sections of the column crystals on the surface of the photostimulable phosphor plate 2 in the production step, it is more preferable to calculate average area S2 of the column crystalss at arbitary several points on the surface of the photostimulable phosphor plate 2 and take the average value of them.

The average area S2 of the column crystals is affected by a temperature and vacuum of the support 21 in deposition, a surface roughness of the support 21, a vapor flow incident angle and the like. Therefore, by controlling these, it is possible to produce column crystals having a desired average area.

Accordingly, in introducing a vapor flow containing raw material of photostimulable phosphor onto the surface of the support 21 to form the photostimulable phosphor layer 25, it is preferable to control the temperature of the support 21 by heating or cooling of the surface of the support 21. Thus, it is possible to control the average area S2 of the column crystals by adjusting the temperature of the whole of the support 21 provided with the photostimulable phosphor layer 25 within a predetermined range and making a deviation from the predetermined range as small as possible.

Though a preferable temperature of the whole of the support 21 in this time varies according to phosphor material, in case of using material included in the above-described general formula (1), the temperature is not more than 200° C., preferably not more than 150° C. and more preferably within the range of 50° C. to 150° C. The deviation of temperature of the support 21 from the predetermined temperature range is preferably within ±20° C., more preferably within ±10° C. and particularly preferably ±5° C.

The vacuum can be controlled by power of a vacuum pump for evacuating a vacuum container for vapor phase deposition and by supplied inert gas. The vacuum is preferably within the range of $5\times10^{-5}$ Pa to 1 Pa, more preferably within the range of $1\times10^{-4}$ Pa to 0.5 Pa.

As for the surface roughness of the support 21, it was found that the column crystals formed on the support 21 tend to be narrower according to higher evenness. Accordingly, the surface roughness can be controlled by polishing of the surface of the support 21, coating material of the surface, a coating method and the like.

Next, an evaporation method, sputtering method and chemical vapor deposition method, which are preferably used as a vapor phase deposition method, will be described.

In the evaporation method, after placing the support 21 in an evaporation apparatus, the inside of the apparatus is evacuated to be vacuum of approximately $1.0\times10^{-4}$ Pa. Subsequently, at least one of photostimulable phosphors is heated and vaporized by resistance heating, an electron beam method or the like to be deposited to a desired thickness on the surface of the support 21. The deposition of the photostimulable phosphor may be performed in several batches and also a plurality of resistance heaters or a plurality of electron beams may be used. Raw material of the photostimulable phosphor may be deposited on the support 21 by using the resistance heater or the electron beam so that the target photostimulable phosphor is synthesized on the support 21 and the photostimulable phosphor layer 25 is formed. The support 21, which is a thing to be deposited on, may be cooled or heated, and the photostimulable phosphor layer 25 may be heat-treated after deposition. The vacuum may be made $5\times10^{-5}$ Pa to 1 Pa, preferably about $1\times10^{-4}$ Pa to 0.5 Pa to perform deposition by adjusting a throttle of opening of an exhaust valve of the deposition apparatus or by introducing inert gas such as nitrogen gas or argon gas.

In the sputtering method, after placing the support 21 in a sputtering apparatus, the inside of the apparatus is evacuated once to be made about a vacuum of $1.333\times10^{-4}$ Pa. Subsequently inert gas of Ar, Ne or the like as gas for sputtering is introduced into the apparatus to have a gas pressure of about $1.333\times10^{-1}$ Pa. Then, a photostimulable phosphor is used as a target and deposited on the surface of the support 21 by sputtering to a desired thickness. This deposition of the photostimulable phosphor may be performed in several batches and each may be performed simultaneously or sequentially so as to sputter the target to form the photostimulable phosphor layer 25. A plurality of photostimulable phosphor materials may be used as the target, which are sputtered simultaneously or sequentially so that the target photostimulable phosphor is synthesized on the support 21 and the photostimulable phosphor layer 25 is formed. Reactive sputtering may be performed by introducing gas of $O_2$, $H_2$ or the like according to need. The support 21, which is a thing to be deposited on, may be cooled or heated, and the photostimulable phosphor layer 25 may be heat-treated after sputtering.

In the CVD (chemical vapor deposition) method, the photostimulable phosphor layer 25 not containing a binder on the support 21 can be obtained by decomposing an organometallic compound containing a target photostimulable phosphor or photostimulable phosphor material by energy of heat, high frequency power or the like. In any of them, it is possible to grow the photostimulable phosphor layer 25 in the vapor phase to be independent elongated column crystals on the support 21.

By combination of methods and/or conditions as above, it is possible to control the average area S2 of the surface of crystals of the photostimulable phosphor layer 25 to a desired size.

In reading a latent image based on radiographic information recorded in the photostimulable phosphor plate 2, the excitation laser light 23 for exciting the photostimulable phosphor 22 is made incident on the surface of the column crystal of the photostimulable phosphor layer 25 as shown in FIG. 3. Thus photostimulated light 24 is generated with intensity corresponding to energy stored in the photostimulable phosphor 22, and the photostimulated light 24 is detected by the optical detector 13.

In the present invention, the inventor focused attention on reduction of image noise caused by a structure of the photostimulable phosphor layer 25 and was dedicated to study it, and consequently, it was found that relation between the average area S1 of the beam of light source for excitation and the average area S2 of the column crystals formed on the surface of the photostimulable phosphor plate 2 has a significant effect on image quality in reading a latent image and a high-quality image can be obtained by a particular condition reducing an influence of random image noise like spot or the like caused by random light interference due to coherency of the laser light source 6.

FIG. 5 shows a situation that the excitation laser light 23 scans on the photostimulable phosphor 22, and the scanning of the excitation laser light 23 is in the direction of the direction A. When photoelectric conversion is performed by taking the photostimulated-light 24 generated by the excitation laser light 23, quality of a read image might be degraded by noise in measurement of radiation, noise caused by a structure of the photostimulable phosphor layer 25, noise generated in conversion of light into an electric signal and the like.

Firstly, energy based on radiation is stored in a photostimulable phosphor according to radiation dose in irradiation of radiation. Photostimulated luminance having intensity depending on the energy is generated by irradiation of the excitation laser light 23 to the photostimulable phosphor in the reading.

Though photostimulated light 24 is generated from each of the column crystals at this time, fluctuation of the amount of photostimulated luminance sometimes occurs owing to variation of the areas of the crystals as shown in FIG. 5, variation of the composition of the crystals and the like.

Additionally, random interference is sometimes caused by light scattering to generate a punctate pattern referred to as laser speckle and noise of uneven light intensity when a part of the excitation laser light 23 irradiated to the photostimulable phosphor is reflected, for example hits against a peripheral optic such as a light guide of the polygon mirror 8, to enter the photostimulable phosphor again, or the excitation laser light 23 having high coherency hits against the surface of the photostimulable phosphor.

On the other hand, a part of reflected light of the excitation laser light 23 on the surface of the photostimulable phosphor enters the optical detector 13 and is detected as a noise component. In order to prevent this, the excitation laser light 23 is removed by a suitable optical filter so as not to enter the optical detector. However, in case that a slight amount of light that fails to be quenched completely comes to be mixed and the mixed light has fluctuation generated by the speckle or the like, the light adversely affects a read image as random image noise.

These phenomena induce fluctuation of light intensity received by the optical detector 13 to invite increase of image noise and degradation of sharpness. Whether such fluctuation of the photostimulated luminance amount or the like is generated or not is determined by relative relationship between the average area S1 of the beam of the excitation laser light 23 irradiated to the surface of the photostimulable phosphor and the average area S2 of the column crystals formed on the surface of the photostimulable phosphor.

Accordingly, the fluctuation of the intensity of light received as the photostimulated light 24 is suppressed effectively by controlling the average area S1 of the beam of the excitation laser light 23 and the average area S2 of the column crystals of the photostimulable phosphor layer 25.

Figure 6:
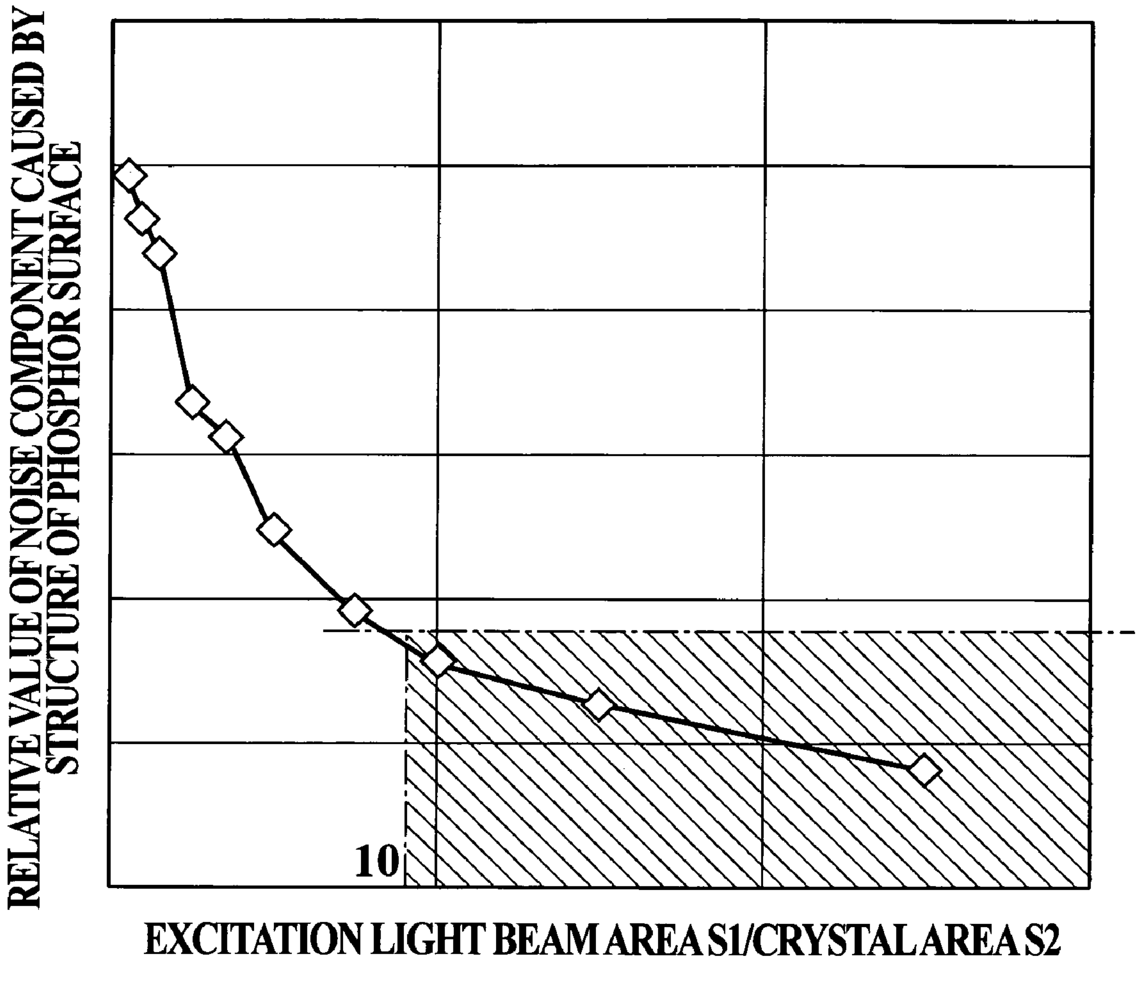
FIG. 6 is a figure illustrating relationship of the beam area of the excitation laser light and the average area of the surface of the column crystals according to the present embodiment.

FIG. 6 is a graph showing relationship between the ratio of the average area S1 of the beam of the excitation laser light 23 to the average area S2 of the column crystals of the photostimulable phosphor layer 25 and a relative value of a noise component generated by fluctuation of the photostimulated light amount owing to variation of respective column crystals and random interference owing to light scattering.

As described above, it is possible to obtain a read image having high quality and good reproducibility by making the average area S1 of the beam of the excitation laser light 23 larger as compared to the average area S2 of the column crystals. On the other hand, however, the beam area of the image reading apparatus directly affects an absolute resolution (so-called DPI or the like) in image reading, and accordingly, excessive expansion of the average area S1 of the beam causes degradation of the resolution in reading of a latent image and also degradation of sharpness.

Thus, while it is preferable to expand the average area S1 of the beam of the excitation laser light 23, it is necessary to provide an upper limit for the average area S1 of the beam of the excitation laser light 23. After consideration of this point, in the radiographic image reading apparatus 1 of the present embodiment, the average area S1 of the beam of the excitation laser light 23 or the average area S2 of the column crystals of the photostimulable phosphor layer 25 is controlled such that the relative relationship (S1/S2) of the average area S1 of the beam of the excitation laser light 23 and the average area S2 of the column crystals is not less than 10 (see a shaded area in FIG. 6), preferably 10 to 10000, more preferably 20 to 100.

More specifically, while the average area S1 of the beam of the excitation light is made $3\times10^{-4}$ to $3\times10^{-2}$ $mm^2$, the average area S2 of the column crystals is made $1\times10^{-6}$ to $1\times10^{-3}$ $mm^2$. Additionally, it is preferable that the average value of an aspect ratio (main scanning direction vs sub scanning direction) in a beam shape of the excitation light is made within the range of 0.6 to 1.7 and the average value of an aspect ratio (main scanning direction vs sub scanning direction) in the shape of the column crystal is made within the range of 0.3 to 3.0.

The photostimulable phosphor plate 2 used as a radiographic image conversion panel is used with repetition of the step of irradiation of radiation (recording of a radiographic image), irradiation of the excitation laser light 23 (reading of the recorded radiographic image) and irradiation of erasing light (erasing of the remaining radiographic image). Ordinarily, shift to each step is performed by a transfer section such as a belt or roller. In a process of using the radiographic image repeatedly in this way, if there is adhesion of dirt or occurrence of a flaw in the side of irradiation of the excitation laser light 23, image quality of an obtained radiographic image is adversely affected.

Generally, photostimulable phosphors have high hygroscopicity, and it is known that, when a photostimulable phosphor is left in a room having ordinary climatic conditions, the photostimulable phosphor absorbs moisture in the air and deteriorates significantly with time. For example, when a photostimulable phosphor is placed under high humidity, increase of absorbed moisture is accompanied by degradation of radiation sensitivity of the photostimulable phosphor. Also generally, because a latent image of a radiographic image recorded in a photostimulable phosphor regresses according to time passage after the irradiation of radiation, the intensity of a reproduced radiographic image signal has a nature that the intensity decreases as the time from the irradiation of radiation to main scanning with the excitation laser light 23 (i.e. reading) increases. The regression of a latent image becomes fast when the photostimulable phosphor absorbs moisture. Therefore the reproducubility of the read reproducing signal of a radiographic image sometimes decreases when the photostimulable phosphor plate 2 having a moisture-absorbing photostimulable phosphor is used.

In the present embodiment, a protective layer 26 is provided so as to cover the surface of the photostimulable phosphor layer 25 in the side of the irradiation of the excitation laser light 23, in order to enhance durability against dirt and scratch and moisture resistance.

As material used in the protective layer 26, polyalkylene film, polyester film, polymethacrylate film, nitrocellulose film, cellulose acetate film and the like may be used and, for example, polypropylene film, polyethylene terephthalate film, polyethylene naphthalate film and the like are preferable from the aspect of transparency and strength.

As the protective layer 26, a material having low permeability of moisture and oxygen, e.g. a film on which alumina, silica or the like is deposited, are more preferably used in order to enhance moisture resistance. Furthermore, the protective layer 26 preferably comprises a multilayer film wherein a film having moisture resistance particularly enhanced and an after-described film capable of controlling the average area S1 of the beam of the excitation laser light 23 are laminated.

Here, the protective layer 26 of the present embodiment contains a film layer treated by coloring with a colorant absorbing light of a particular wavelength selectively. Thus, by using one or more film layer treated by coloring with a colorant for the protective layer 26, it is made possible to control an optical transparency for each wavelength to predetermined characteristics. As the colorant, various organic pigments or inorganic pigments may be used.

The protective layer 26 of the present embodiment transmits the excitation laser light 23, the photostimulated light 24 and light in a predetermined visible region and absorbs and decays light in a wave range of the visible range except these wave ranges by the film layer treated by coloring with the colorant.

Figure 9:
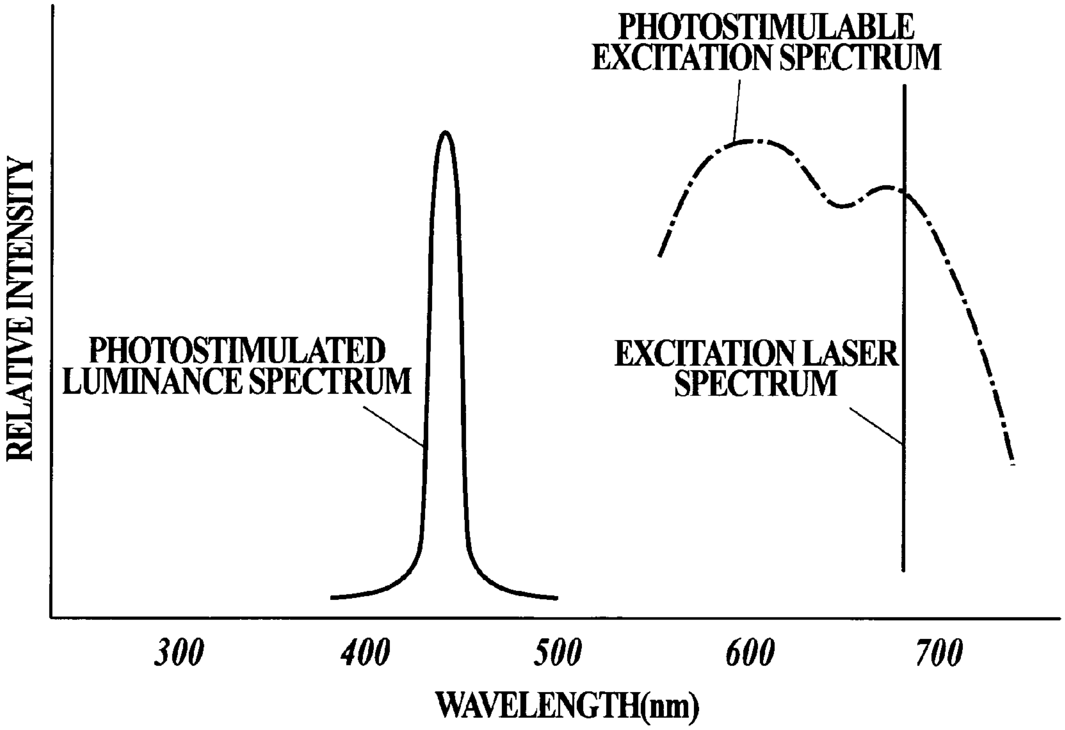
FIG. 9 is a graph showing the optical transmittance characteristic of the protective layer according to the present embodiment.

FIG. 9 shows the relationship of relative intensity of transmitted light to wavelength as transmission properties of the spectrum of the protective layer 26. In the present embodiment, when the wavelength of the photostimulated light 24 of a used photostimulable phosphor is 400 to 500 nm and the wavelength of the excitation laser light 23 is in the region of 700 nm, the protective layer 26 is a configuration having properties for sufficiently transmitting spectra in a wavelength of 400 to 500 nm and in the region of 700 nm. That is, in the film layer treated by coloring with the colorant of the protective layer 26, the excitation laser light 23, the photostimulated light 24 and light in the predetermined visible region are transmitted, while the transmission properties of spectra of the excitation laser light 23 and the photostimulated light 24 is made relatively strong by absorbing light of a wave range in a visible range except these wave ranges to decay the light.

As above, imparting the property of sufficiently transmitting only the excitation laser light 23 and the photostimulated light 24 to the protective layer 26 facilitates spectra separation of preventing the photostimulable phosphor plate 2 from being irradiated with light except the excitation laser light 23 when scanning with the excitation laser light 23 or the optical detector 13 from detecting stray light owing to surface reflection except the photostimulated light 24, and makes it possible to reduce image noise and damage of photostimulable phosphor owing to undesired light not relating to excitation.

The protective layer 26 has a property of transmitting light in a predetermined visible region (in the region of 500 nm in the present embodiment) in addition to the excitation laser light 23 and photostimulated light 24. Therefore, in production process and repeated use, it is possible to facilitate detection and discrimination of defects by visual recognition of damage and adhesion of foreign material to the inside of the photostimulable phosphor and the protective layer 26 or dirt adhesion between the photostimulable phosphor layer 25 and the protective layer 26, and it is possible to facilitate reduction of the effect of these on image quality.

Figure 7:
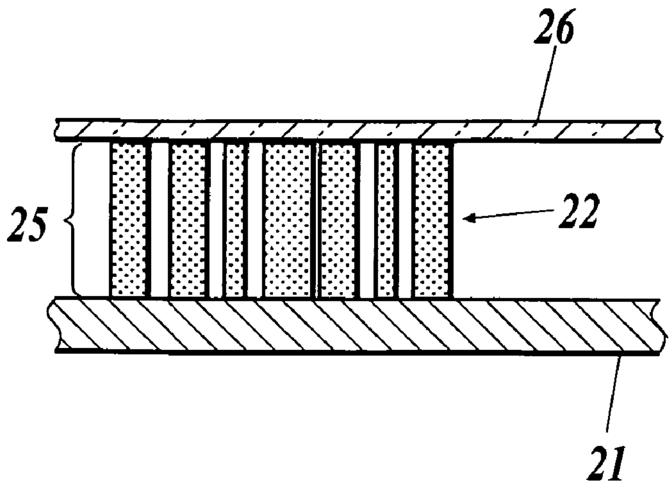
FIG. 7 is a figure showing the configuration of a photostimulable phosphor plate comprising a protective layer according to the present embodiment.

FIG. 7 shows a state that the protective layer 26 is provided so as to cover the surface of the photostimulable phosphor 22. The photostimulable phosphor layer 25 comprising the photostimulable phosphor 22 is formed on the surface of the support 21 and the protective layer 26 is formed on the surface of the photostimulable phosphor layer 25. In this case, the protective layer 26 may be formed by directly applying a coating liquid for a protective layer to the surface of the photostimulable phosphor layer 25 or by depositing material of the protective layer, or the protective layer 26 formed separately in advance may be bound or adhere to the photostimulable phosphor layer 25.

Figure 8:
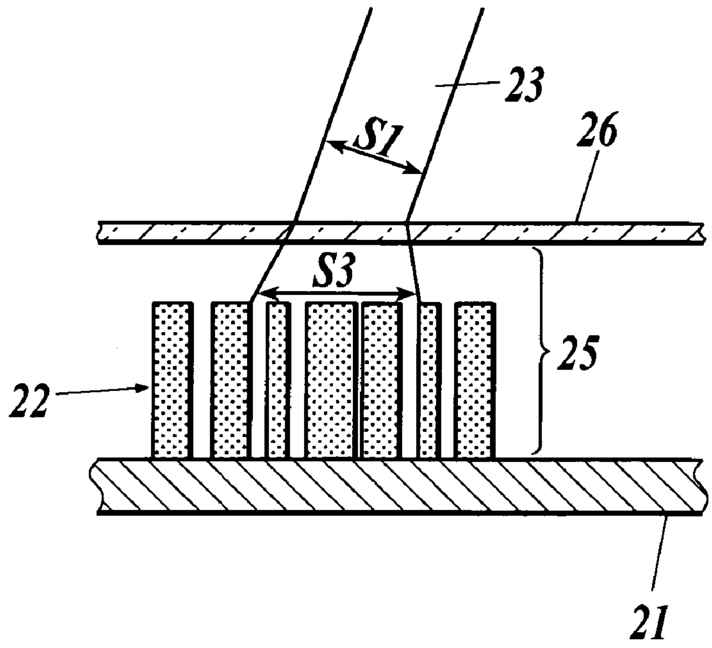
FIG. 8 is a figure showing another configuration of a photostimulable phosphor plate comprising a protective layer according to the present embodiment.

The protective layer 26 may be provided such that a gap is formed between the photostimulable phosphor 22 and the protective layer 26 as shown in FIG. 8. In this case, after the photostimulable phosphor layer 25 comprising the photostimulable phosphor 22 is formed inside the support 21 formed to be concave, the protective layer 26 is provided at the position from the photostimulable phosphor layer 25 at a certain distance by binding the protective layer 26 formed separately in advance to the open end portion of the concave support 21 or the like.

The protective layer 26 of the present embodiment is provided so as to seal the surface of the column crystals as shown in FIG. 7. Preferably, the protective layer 26 is provided in such a way the irregularities of the crystal surface after sealing (the surface of the protective layer 26) are smaller than the mean peak-to-valley height of the crystal surface. Thereby, it is possible to further reduce an effect on latent image reading owing to variation of growth of crystals. It is possible to achieve to prevent irregularities of the crystal surface from appearing above the surface of the protective layer 26 by controlling an exhausting pressure and the like.

Here, as above described, in view of resolution and sharpness required of the reading apparatus, the relative relationship (S3/S2) between the average average area S3 of the beam in the range in which the area of a beam of the excitation laser light 23 irradiated to the plate after transmission of the protective layer 26, i.e. a beam projected onto the photostimulable phosphor surface, is considered and the average area S2 of the column crystals is not less than 10 (see a shaded area in FIG. 4), preferably 0.10 to 10000, more preferably 20 to 100. In the present embodiment, the protective layer 26 is given a function for controlling the average area S3 of the beam of the excitation laser light 23 which is transmitted through the protective layer 26.

That is, the protective layer 26 is made capable of controlling the average area S3 of the beam of the excitation laser light 23 which is transmitted through the protective layer 26 by adjusting light diffusion properties of the protective layer 26 by a predetermined processing to one or both surface of the protective layer 26. The predetermined processing includes a method of adjusting the roughness of one or both surface of the protective layer 26, a method of adding light scattering particles to the protective layer 26, a method of providing micro protrusions like ground glass for one or both surface of the protective layer 26 in the case of using glass as the protective layer 26, and the like.

The method of adjusting the roughness of one or both surface of the protective layer 26 includes a method of embossing one or both surface of the protective layer 26, i.e. providing micro protrusions by machining, a method of spreading particles of tetrafluoroethylene resin (FTFE), methyl methacrylate resin (PMMA), silica (silicic anhydride) or the like on one or both surface of the protective layer 26, a method of coating one or both surface of the protective layer 26 with a layer containing particles PTFE, PMMA, silica or the like, and the like.

The protective layer 26 may be formed by laminating such an inorganic substance as SiC and $SiO_2$ on the surface of the photostimulable phosphor layer 25 by a vapor phase deposition method. In this case, because the light scattering diffusibility can be adjusted by the thickness, material and the like of the laminating, it is possible to control the average area S3 of the beam reaching the surface of the photostimulable phosphor layer 25. In the case of forming the thin protective layer 26 by vapor phase deposition, preferably, the average area S2 of the column crystals in the surface of the photostimulable phosphor layer is replaced by the area in the protective layer 26 and then the above-described relative relationship holds.

Next, the radiographic image reading method using the above-described radiographic image reading apparatus 1 will be described.

In order to read a radiographic image by using the above-described radiographic image reading apparatus, firstly, the optical scanning section 7 scans with the excitation laser light 23 by control of the controller 18 according to a predetermined operation program and simultaneously the read head 5 moves in the sub scanning direction to irradiate the whole area of the surface of the photostimulable phosphor plate 2 with the excitation laser light 23 emitted from the laser light source 6.

When the excitation laser light 23 is emitted from the laser light source 6, the laser light source 6 emits the excitation laser light 23 as parallel rays and the cylindrical lens 10 focuses the parallel rays of the excitation laser light 23 to be linear only along the direction perpendicular to the rotation axis of the polygon mirror 8 to be made incident on the surface of the polygon mirror 8. The polygon mirror 8 rotating and reflecting the excitation laser light 23 to change the reflection angle of the excitation laser light 23 to scan the surface of the photostimulable phosphor plate 2 in the main scanning direction. In this time, the fθ lens 11 converts motion with uniform angular velocity of the excitation laser light 23 scanned by the polygon mirror 8 into motion with uniform velocity and uniforms the beam radius of the excitation laser light 23 on the surface of the photostimulable phosphor plate 2. Thereby, the optical scanning section 7 scans the surface of the photostimulable phosphor plate 2 with the excitation laser light 23 at a uniform beam velocity and a uniform beam radius.

A main scanning synchronization sensor 12 detects an initial timing of main scanning is provided in a non-image area of scanning line. The main scanning synchronization sensor 12 is a base point for calculating a reading station in the main scanning direction.

In the present embodiment, the average area S1 of the beam of the excitation laser light 23 or the average area S2 of the column crystals of the photostimulable phosphor layer 25 is controlled such that the relative relationship (S1/S2) of the average area S1 of the beam of the excitation laser light 23 and the average area S2 of the column crystals is not less than 10, preferably 10 to 10000, more preferably 20 to 100.

More specifically, while the average area S1 of the beam of the excitation light is made $3\times10^{-4}$ to $3\times10^{-2}$ $mm^2$, the average area S2 of the column crystals is made $1\times10^{-6}$ to $1\times10^{-3}$ $mm^2$. Additionally, it is preferable that the average value of an aspect ratio (main scanning direction vs sub scanning direction) in a beam shape of the excitation light is made within the range of 0.6 to 1.7 and the average value of an aspect ratio (main scanning direction vs sub scanning direction) in the shape of the column crystal is made within the range of 0.3 to 3.0.

As described above, the average area S1 of the beam can be adjusted by adjusting the beam radius of the excitation laser light 23 incident to the fθ lens 11 or the focal length of the fθ lens. That is, when the focal length of the fθ lens 11 is made short, the spot size on an image-formation plane becomes relatively small, and when a beam incident to the fθ lens 11 is made larger by adjustment of the focal length of the collimating lens 9, the spot size of the image-formation plane becomes relatively small.

It is made possible to adjust the beam radius of the excitation laser light 23 incident to the fθ lens 11 by adjusting the focal length of the collimating lens 9, by designing the numerical aperture of the collimating lens 9 accordingly, by providing a mechanism, such as a beam expander, for adjustment of a beam radius at the optical pass between the collimating lens 9 and the cylindrical lens 10, or the like.

As described above, it is also possible to control the specific average area S1 of the beam of the excitation laser light 23 irradiated to the photostimulable phosphor surface by performing a predetermined treatment to the surface of the protective layer 26 to adjust light diffusion properties.

On the other hand, as described above, the average area S2 of the column crystals can be controlled to a desired area by combination of a production method such as an evaporation method, a sputtering method and chemical vapor deposition, and conditions because of being affected by the temperature and vacuum of the support 21 in deposition, the surface roughness of the support 21, the vapor flow incident angle, and the like.

Next, by control of the controller 18, the optical detector 13 provided for the read head 5 detects photostimulated luminescence (photostimulated light 24) generated in the photostimulable phosphor plate 2 by the excitation laser light 23 and then converts the detected photostimulated light 24 into photocurrent by photoelectric conversion to transfers it to the photocurrent-voltage converter 14. The collimating lens 9 converts the photocurrent into photovoltage to transfer it to the amplifier 15. The amplifier 15 amplifies and logarithmically converts the photovoltage to transfer it to the A/D converter 17. The A/D converter 17 converts data relating to the photovoltage into digital data to transfer it as radiographic information to the image processing/image data memory 19 and then the image processing/image data memory 19 stores the transferred radiographic information.

In order to release residual energy that is not completely released by the excitation laser light 23, the light source 16 for erase irradiate the photostimulable phosphor plate 2 with light having a wavelength and intensity sufficient to release the photostimulated light 24 equivalent of the residual energy.

As above, according to the radiographic image reading apparatus 1 or the radiographic image reading method of the present embodiment, the relative relationship (S1/S2) of the average area S1 of the beam of the excitation laser light 23 and the average area S2 of the column crystals is not less than 10, preferably 10 to 10000, more preferably 20 to 100, and the beam area of the excitation laser light 23 incident on the column crystals is made not smaller than a predetermined ratio to the average area S2 of the column crystals, which makes it possible to suppress scattering of the excitation laser light 23 on the irregularities of the surface of the column crystals. Consequently, it is possible to reduce occurrence of image noise generated by interference of the excitation laser light 23, laser speckle or the like.

In the present embodiment, an upper limit is provided for the excitation laser light 23 of the excitation laser light 23 and, in case within this range, the absolute resolution in image reading (so-called DPI or the like) is not decreased.

In the present embodiment, because the protective layer 26 existing between the excitation laser light 23 and the column crystals performs a function for imparting diffusion properties to the excitation laser light 23, an effect similar to the above is obtained.

Furthermore, in the present embodiment, separation of the excitation laser light and the photostimulated light can be made easy by giving the protective layer characteristics that unnecessary light not related to excitation of radiation energy is absorbed and the excitation laser light and the photostimulated light is transmitted by the film layer that is treated by coloring with a colorant selectively absorbing light of particular wavelength. It is possible to reduce image noise and damage of the photostimulable phosphor plate owing to unnecessary light not related to excitation.

By giving the protective layer characteristics of transmitting light in a predetermined visible range as well as the excitation laser light and the photostimulated light, it is possible to facilitate detection and discrimination of defects by visual recognition of damage and adhesion of foreign material to the inside of the photostimulable phosphor and the protective layer or dirt adhesion between the photostimulable phosphor layer and the protective layer in production process of a photostimulable phosphor plate and repeated use.

Though the embodiments of the present invention has been described, it will be obvious that the prevent invention is not limited to these embodiments but can be changed within the scope without departing from the purpose of the invention.

For example, though the example in which a laser light source is used as the excitation laser light 23 for reading was described, without limitation thereto, it is possible to use a light source capable of releasing energy sufficient for excitation.

According to the present invention as above, without providing the photostimulable phosphor layer with a component not directly related to photostimulated luminance, it is possible to suppress occurrence of random image noise like spots caused by random light interference due to coherency of the excitation laser light and read an image having good image quality with excellent sharpness.

Also, in the present invention, an upper limit for the size of the average area S1 of the beam of excitation laser light is provided, and accordingly an absolute resolution in image reading is not degraded.

Also, in the case of reading an image from the photostimulable phosphor plate provided with a protective layer, a similar effect can be obtained.

Furthermore, image noise of a radiographic image can be reduced by facilitating separation of spectra of excitation laser light and photostimulated light by the protective layer and make transmission characteristics of the laser light and the photostimulated light relatively stronger than unnecessary light not related to excitation.

By facilitating detection and discrimination of defects by visual recognition of damage and adhesion of foreign material to the inside of the photostimulable phosphor and the protective layer or dirt adhesion between the photostimulable phosphor layer and the protective layer, reduction of the effect of these on image quality is made easy.

The entire disclosure of Japanese Patent Applications No. Tokugan 2004-001044 filed on Jan. 6, 2004 and No. Tokugan 2004-296022 filed on Oct. 8, 2004 including specification, claims, drawings and summary are incorporated herein by reference in its entirety.

What is claimed is:

1. A radiographic image reading method comprising:

scanning a photostimulable phosphor plate with excitation light by a scanning section such that a relative relationship between an average area S2 of column crystals of a photostimulable phosphor and an average area S3 of a beam of the excitation light emitted from a light source is S3≧10*S2, the photostimulable phosphor plate comprising:

a support;

and a photostimulable phosphor layer comprising the column crystals of the photostimulable phosphor formed on a surface of the support; and the protective layer provided so as to cover a surface of the photostimulable layer, said protective layer diffuses the beam of excitation light as the light passes through the protective layer, wherein radiation energy is stored in the photostimulable layer; and producing an image from detected photostimulated emitted from the photostimulable phosphor layer by the scanning with the excitation light.

2. The method of claim 1, wherein the average area S2 of the column crystals is $1\times10^{-6}$ to $1\times10^{-3}$ $mm^2$ and the average area S3 of the beam of the excitation light transmitted through the protective layer is $3\times10^{-4}$ to $3\times10^{-2}$ $mm^2$.

3. The method of claim 1, wherein the relative relationship between the average area S2 of the column crystals and the average area S3 of the beam of the excitation light transmitted through the protective layer is made 10×S2≦S3 ≦10000×S2.

4. The method of claim 1, wherein one or both surface(s) of the protective layer are embossed with many micro protrusions.

5. The method of claim 1, wherein the protective layer contains particles having light scattering properties.

6. The method of claim 1, wherein the protective layer comprises a multilayer film using one or more film layers treated by coloring with a colorant selectively absorbing light having a particular wavelength.

7. A radiographic image reading apparatus comprising:

a light source for emitting a beam of excitation light to a photostimulable phosphor plate comprising:

a support;

a photostimulable phosphor layer comprising column crystals of a photostimulable phosphor formed on a surface of the support; and a protective layer provided so as to cover a surface of the photostimulable phosphor layer, said protective layer diffuses the beam of excitation light as the light passes through the protective layer, wherein radiation energy is stored in the photostimulable phosphor layer;

a scanning section for scanning the photostimulable phosphor plate with the excitation light such that a relative relationship between an average area S2 of the column crystals and an average area S3 of the beam of the excitation light transmitted through the protective layer is S3≧10×S2; and a detector for detecting photostimulated light emitted from the photostimulable phosphor layer by the scanning with the excitation light.

8. The apparatus of claim 7, wherein the average area S2 of the column crystals is 1.times.10.sup.−6 to 1.times.10.sup.−3 mm.sup.2 and the average area S3 of the beam of the excitation light transmitted through the protective layer is 3.times.10.sup.−4 to 3.times.10.sup.−2 mm.sup.2.

9. The apparatus of claim 7, wherein the relative relationship between the average area S2 of the column crystals and the average area S3 of the beam of the excitation light transmitted through the protective layer is made 10.times.S2.ltoreq.S3.ltoreq.10000.times.S2.

10. The apparatus of claim 7, wherein one or both surface(s) of the protective layer are embossed with many micro protrusions.

11. The apparatus of claim 7, wherein the protective layer contains particles having light scattering properties.

12. The method apparatus of claim 7, wherein the protective layer comprises a multilayer film using one or more film layers treated by coloring with a colorant selectively absorbing light having a particular wavelength.

* * * * *